(12) United States Patent
Simpson

(10) Patent No.: US 7,499,933 B1
(45) Date of Patent: Mar. 3, 2009

(54) SYSTEM AND METHOD FOR MANAGING ENTERPRISE APPLICATION CONFIGURATION

(75) Inventor: Thomas George Simpson, The Woodlands, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 289 days.

(21) Appl. No.: 11/270,926

(22) Filed: Nov. 12, 2005

(51) Int. Cl.
*G06F 17/30* (2006.01)
*G06F 9/45* (2006.01)

(52) U.S. Cl. ............................ 707/101; 707/1; 707/3; 707/102; 717/106; 717/114; 717/140; 717/170; 717/174

(58) Field of Classification Search ............. 707/1–5, 707/101, 102; 717/101, 106, 114, 140, 148, 717/170, 174
See application file for complete search history.

(56) References Cited

U.S. PATENT DOCUMENTS

| 4,751,702 | A | 6/1988 | Beier et al. ............... 714/13 |
|---|---|---|---|
| 5,027,269 | A | 6/1991 | Grant et al. ............... 709/224 |
| 5,301,320 | A | 4/1994 | McAtee et al. ............. 709/9 |
| 5,325,527 | A | 6/1994 | Cwikowski et al. ......... 709/222 |
| 5,499,371 | A | 3/1996 | Henninger et al. ......... 717/108 |
| 5,539,885 | A | 7/1996 | Ono et al. ............... 709/203 |
| 5,553,235 | A | 9/1996 | Chen et al. ............... 714/20 |
| 5,566,297 | A | 10/1996 | Devarakonda ............. 714/15 |
| 5,594,863 | A | 1/1997 | Stiles ....................... 714/15 |
| 5,630,047 | A | 5/1997 | Wang ....................... 714/15 |
| 5,630,173 | A | 5/1997 | Oprescu |
| 5,673,403 | A | 9/1997 | Brown et al. ............... 715/744 |
| 5,689,698 | A | 11/1997 | Jones et al. ............... 707/4 |
| 5,692,181 | A | 11/1997 | Anand et al. ............... 707/102 |
| 5,712,971 | A | 1/1998 | Stanfill et al. ............ 714/34 |
| 5,717,925 | A | 2/1998 | Harper et al. |
| 5,732,262 | A | 3/1998 | Gillespie et al. |
| 5,734,887 | A | 3/1998 | Kingberg et al. ........... 707/4 |
| 5,737,592 | A | 4/1998 | Nguyen et al. |
| 5,761,499 | A | 6/1998 | Sonderegger |

(Continued)

FOREIGN PATENT DOCUMENTS

WO 01/35209 5/2001

(Continued)

OTHER PUBLICATIONS

Thomas; Enterprise Javabeans(TM) Technology: Server Component Model for the Java(TM) Platform, java.sun.com, May 2, 1999.

(Continued)

*Primary Examiner*—Cheryl Lewis
(74) *Attorney, Agent, or Firm*—Lowenstein Sandler PC

(57) ABSTRACT

A system and a method of managing configuration files of an application includes a database storing a plurality of configuration file parameters associated with one or more environments, a plurality of application component templates, and a plurality of pre-defined configuration files, wherein the pre-defined files combine an application component template with the configuration file parameters, and a configuration tool for generating and modifying the configuration files of an application. The system and method support multiple deployments of an application across multiple environments by modifying the parameters within the configuration files at an application level just prior to deployment onto a specific environment, as opposed to the conventional methods of managing the configuration files at a file level.

18 Claims, 3 Drawing Sheets

U.S. PATENT DOCUMENTS

| | | |
|---|---|---|
| 5,768,119 A | 6/1998 | Havekost et al. ............... 700/4 |
| 5,784,557 A | 7/1998 | Oprescu |
| 5,790,809 A | 8/1998 | Holmes ...................... 709/228 |
| 5,801,689 A | 9/1998 | Huntsman ................... 715/733 |
| 5,802,367 A | 9/1998 | Held et al. |
| 5,806,075 A | 9/1998 | Jain et al. .................... 707/201 |
| 5,815,415 A | 9/1998 | Bentley et al. |
| 5,845,292 A | 12/1998 | Bohannon et al. ........... 707/202 |
| 5,889,992 A | 3/1999 | Koerber |
| 5,899,990 A | 5/1999 | Maritzen et al. ................ 707/4 |
| 5,926,637 A | 7/1999 | Cline et al. ................. 717/103 |
| 5,930,768 A | 7/1999 | Hooban ........................ 705/27 |
| 5,937,198 A | 8/1999 | Nelson et al. ............... 717/103 |
| 5,937,402 A | 8/1999 | Pandit ........................... 707/4 |
| 5,946,458 A | 8/1999 | Austin et al. ............... 358/1.15 |
| 5,949,412 A | 9/1999 | Huntsman ................... 715/740 |
| 5,960,200 A | 9/1999 | Eager et al. |
| 5,960,445 A | 9/1999 | Tamori et al. ............... 707/203 |
| 5,987,247 A | 11/1999 | Lau ............................ 717/100 |
| 5,999,179 A | 12/1999 | Kekic et al. ................. 715/734 |
| 6,003,075 A | 12/1999 | Arendt et al. ............... 709/221 |
| 6,009,274 A | 12/1999 | Fletcher et al. ............. 717/173 |
| 6,009,405 A | 12/1999 | Leymann et al. |
| 6,011,916 A | 1/2000 | Moore et al. |
| 6,046,742 A | 4/2000 | Chari ......................... 715/734 |
| 6,052,456 A | 4/2000 | Huang .................... 379/201.04 |
| 6,065,009 A | 5/2000 | Leymann et al. |
| 6,083,276 A | 7/2000 | Davidson et al. |
| 6,101,489 A | 8/2000 | Lannert et al. |
| 6,101,601 A | 8/2000 | Matthews et al. ............... 713/2 |
| 6,108,698 A | 8/2000 | Tenev et al. |
| 6,148,296 A | 11/2000 | Tabbara ......................... 707/3 |
| 6,163,776 A | 12/2000 | Periwal ......................... 707/4 |
| 6,173,439 B1 | 1/2001 | Carlson et al. |
| 6,178,409 B1 | 1/2001 | Weber et al. |
| 6,184,996 B1 | 2/2001 | Gase ........................ 358/1.15 |
| 6,185,613 B1 | 2/2001 | Lawson et al. |
| 6,195,676 B1 | 2/2001 | Spix et al. ................... 718/107 |
| 6,226,684 B1 | 5/2001 | Sung et al. |
| 6,230,319 B1 | 5/2001 | Britt, Jr. et al. ............. 717/173 |
| 6,246,410 B1 | 6/2001 | Bergeron et al. ............ 715/854 |
| 6,249,877 B1 | 6/2001 | Kawakami et al. ............. 714/6 |
| 6,253,193 B1 | 6/2001 | Ginter et al. |
| 6,272,556 B1 | 8/2001 | Gish |
| 6,282,698 B1 | 8/2001 | Baker et al. |
| 6,288,790 B1 | 9/2001 | Yellepeddy et al. ........ 358/1.15 |
| 6,289,336 B1 | 9/2001 | Melton et al. .................. 707/3 |
| 6,292,933 B1 | 9/2001 | Bahrs et al. |
| 6,298,353 B1 | 10/2001 | Apte |
| 6,304,871 B1 | 10/2001 | Gajda et al. .................... 707/4 |
| 6,314,430 B1 | 11/2001 | Chang ................... 707/103 R |
| 6,317,738 B1 | 11/2001 | Lohman et al. ................ 707/3 |
| 6,324,525 B1 | 11/2001 | Kramer et al. |
| 6,324,619 B1 | 11/2001 | Raverdy et al. |
| 6,332,161 B1 | 12/2001 | Sasson ....................... 709/227 |
| 6,353,820 B1 | 3/2002 | Edwards et al. ................ 707/2 |
| 6,363,363 B1 | 3/2002 | Haller et al. |
| 6,363,499 B1 | 3/2002 | Delo et al. .................... 714/15 |
| 6,381,609 B1 | 4/2002 | Breitbart et al. |
| 6,430,556 B1 | 8/2002 | Goldberg et al. ............... 707/4 |
| 6,438,749 B1 | 8/2002 | Chamberlain ............... 717/174 |
| 6,442,533 B1 | 8/2002 | Hinkle |
| 6,442,748 B1 | 8/2002 | Bowman-Amuah ......... 717/108 |
| 6,453,127 B2 | 9/2002 | Wood et al. ..................... 399/8 |
| 6,463,343 B1 | 10/2002 | Emens et al. ................ 700/83 |
| 6,463,439 B1 | 10/2002 | Dahlberg |
| 6,467,079 B1 | 10/2002 | Ettritch et al. |
| 6,470,384 B1 | 10/2002 | O'Brian et al. ............. 709/223 |
| 6,473,786 B1 | 10/2002 | Scouras et al. .............. 709/206 |
| 6,477,580 B1 | 11/2002 | Bowman-Amuah ......... 709/231 |
| 6,477,590 B1 | 11/2002 | Habusha et al. .............. 710/29 |
| 6,480,860 B1 | 11/2002 | Monday |
| 6,480,894 B1 | 11/2002 | Courts et al. |
| 6,484,310 B1 | 11/2002 | Przbylski et al. ............ 717/101 |
| 6,502,095 B2 | 12/2002 | Breitbart et al. |
| 6,502,207 B1 | 12/2002 | Itoh et al. ...................... 714/15 |
| 6,505,238 B1 | 1/2003 | Tran ........................... 709/208 |
| 6,510,352 B1 | 1/2003 | Badavas et al. |
| 6,518,983 B1 | 2/2003 | Grohmann et al. .......... 715/781 |
| 6,526,571 B1 | 2/2003 | Aizikowitz et al. |
| 6,539,337 B1 | 3/2003 | Provan et al. |
| 6,546,419 B1 | 4/2003 | Humpleman et al. ........ 709/223 |
| 6,553,428 B1 | 4/2003 | Ruehle et al. |
| 6,557,039 B1 | 4/2003 | Leong et al. ................ 709/229 |
| 6,571,282 B1 | 5/2003 | Bowman-Amuah ......... 709/219 |
| 6,571,389 B1 | 5/2003 | Spyker et al. |
| 6,578,068 B1 | 6/2003 | Bowman-Amuah ......... 709/203 |
| 6,584,497 B1 | 6/2003 | Case et al. .................. 709/217 |
| 6,590,587 B1 | 7/2003 | Wichelman et al. ......... 715/736 |
| 6,615,258 B1 | 9/2003 | Barry et al. ................. 709/223 |
| 6,643,679 B1 | 11/2003 | Erickson et al. ............. 718/101 |
| 6,654,784 B1 | 11/2003 | Wei ............................ 709/203 |
| 6,657,625 B1 | 12/2003 | Chik et al. .................. 345/467 |
| 6,675,228 B1 | 1/2004 | Bahrs et al. ................. 719/318 |
| 6,725,231 B2 | 4/2004 | Hu et al. |
| 6,928,488 B1 | 8/2005 | de Jong et al. |
| 7,065,493 B1 * | 6/2006 | Homsi ........................... 705/8 |
| 2001/0020255 A1 | 9/2001 | Hofmann et al. ............ 719/318 |
| 2001/0029604 A1 | 10/2001 | Dreyband et al. |
| 2002/0010867 A1 | 1/2002 | Schaefer et al. ............... 726/22 |
| 2002/0046239 A1 | 4/2002 | Stawikowski et al. ....... 709/203 |
| 2002/0055804 A1 | 5/2002 | Betawar et al. |
| 2002/0062475 A1 | 5/2002 | Iborra et al. ................. 717/108 |
| 2002/0065814 A1 | 5/2002 | Okamoto et al. |
| 2002/0069156 A1 | 6/2002 | Adam et al. |
| 2002/0069192 A1 | 6/2002 | Aegerter ........................ 707/1 |
| 2002/0078115 A1 | 6/2002 | Poff et al. |
| 2002/0103725 A1 | 8/2002 | Martin et al. |
| 2002/0103835 A1 | 8/2002 | Kearney ..................... 715/530 |
| 2002/0109718 A1 | 8/2002 | Mansour et al. ............. 715/744 |
| 2002/0111995 A1 | 8/2002 | Mansour et al. ............. 709/203 |
| 2002/0111999 A1 | 8/2002 | Andersson .................. 709/203 |
| 2002/0116205 A1 | 8/2002 | Ankireddipally et al. |
| 2002/0120685 A1 | 8/2002 | Srivastava et al. ........... 709/203 |
| 2002/0124113 A1 | 9/2002 | Gargya et al. ............... 709/246 |
| 2002/0129096 A1 | 9/2002 | Mansour et al. ............. 709/203 |
| 2002/0133579 A1 | 9/2002 | Bernhardt et al. |
| 2002/0143721 A1 | 10/2002 | Charlet et al. .................. 707/1 |
| 2002/0143819 A1 | 10/2002 | Han et al. .................... 715/513 |
| 2002/0144101 A1 | 10/2002 | Wang et al. |
| 2002/0147857 A1 | 10/2002 | Sanchez, II et al. |
| 2002/0178191 A1 | 11/2002 | Sielken |
| 2002/0178434 A1 | 11/2002 | Fox et al. .................... 717/106 |
| 2002/0188765 A1 | 12/2002 | Fong et al. |
| 2002/0188928 A1 | 12/2002 | Szpak et al. ................. 717/106 |
| 2003/0009323 A1 | 1/2003 | Adeli |
| 2003/0028555 A1 | 2/2003 | Young et al. ................ 707/204 |
| 2003/0033121 A1 | 2/2003 | Chen et al. |
| 2003/0033159 A1 | 2/2003 | Altomare |
| 2003/0036809 A1 | 2/2003 | Landman et al. ............... 700/4 |
| 2003/0046317 A1 | 3/2003 | Cseri et al. .................. 715/513 |
| 2003/0050897 A1 | 3/2003 | Altomare |
| 2003/0069907 A1 | 4/2003 | Moreau et al. .............. 715/513 |
| 2003/0084067 A1 | 5/2003 | Obiaya |
| 2003/0093574 A1 | 5/2003 | Fablet et al. ................ 719/310 |
| 2003/0097383 A1 | 5/2003 | Smirnov et al. ............. 707/204 |
| 2003/0160813 A1 | 8/2003 | Raju ........................... 715/730 |
| 2003/0217033 A1 | 11/2003 | Sandler et al. |
| 2004/0107183 A1 | 6/2004 | Mangan ......................... 707/2 |
| 2004/0230587 A1 | 11/2004 | Doddington ................ 707/100 |
| 2005/0030555 A1 | 2/2005 | Phenix et al. |

| | | |
|---|---|---|
| 2006/0123414 A1 * | 6/2006 | Fors et al. .................... 717/177 |

FOREIGN PATENT DOCUMENTS

| | | |
|---|---|---|
| WO | 01/63529 | 8/2001 |
| WO | 02/46916 | 6/2002 |
| WO | 02/046980 | 6/2002 |
| WO | 03/001373 | 1/2003 |

OTHER PUBLICATIONS

Rennhackkamp; One for the Road: Sybaseaes Adaptive Server Anywhere 6.0, M&T Publishing Inc., Section No. 10, vol. 11, p. 55, ISSN. 1041-5173, no date.

McClanahan; Powerbuilder3.0, M&T Publishing Inc., vol. 6, No. 11, p. 57, ISSN. 1041-5173, Oct. 1993.

Unknown; Conjuring up Com Through Scripting, p. 14, Jul. 2000.

Quantum SPC/DC Script File (. TDF) Definition Instruction Guide, ASI Data Myte Inc., Version 2.4, p. 2-14, 2004.

Myers; Scripting Graphical Applications by Demonstration, Human Computer Interaction Institute, Carnegie Mellon University, www.cs.cmu.edu/bam, p. 1-8, Apr. 1998.

Ousterhoust; Scripting Higher Level Programming for the 21st Century, Sun Microsystems Laboratories, Draft #2, p. 1-14, May 10, 1997.

Dolev, et al.; An Integrated Architecture for the Scalable Delivery of Semi-Dynamic Web Content, Proceedings of the Seventh International Symposium on Computers and Communications, IEEE, 2002.

Betwixt: Turning Beans into XML, Apache Software Foundation, Archived Jun. 20, 2002 at <http://web.archive.org/web/20020620000410/http://jakarta.apache.org.commons/betwixt/>, p. 1 of 1, Nov. 13, 2005.

XML Schema Part 0 Primer-W3C Working Draft, W3C, Feb. 2000, Retrieved From the Internet on Nov. 18, 2005 at <http://www.w3.org/tr/2000/wd-xmlschema-0-20000225/>, 42 pages.

Frank M. Carrano, et al.; Frank M. Carrano, et al., Data Abstraction and Problem Solving With C++, Aug. 1998, Addison-Wesley, Chapter 2.

Brodkin; Brodkin, Use XML Data Binding to do Your Laundry, Retrieved From the Internet on May 19, 2006, Acessed and Printed From From the Internet on May 19, 2006 at http://www.javaworld.com/javaworld/jw-12-2001/jw-1228-jaxb.html.

* cited by examiner

SYSTEM AND METHOD FOR MANAGING ENTERPRISE APPLICATION CONFIGURATION

BACKGROUND OF THE INVENTION

1. Field of the Invention

The present invention relates generally to a system and method for managing the configuration of an application with respect to one or more environments.

2. Related Art

When an organization, such as a large corporation, develops software internally, referred to herein as enterprise software, typically it is deployed onto a server or a set of servers, often between multiple platforms in order to be used in different environments within the corporation. In order for the application to interact with each environment, certain settings or parameters of the application must be modified for each environment. The parameters are maintained in one or more configuration files of the application. The parameters are modified by accessing each relevant configuration file within the application and changing each parameter manually, typically by a system administrator or software programmer. The changes are saved and the application is deployed onto the particular environment.

Currently, two methods are used to modify the configuration files of an application. One method is to modify the configuration files during the "runtime" of the application where the configuration files are accessed and modified each time the application is deployed onto a new environment. The runtime method requires knowledge of the parameters related to each environment and manual generation or modification of the files prior to deployment. The second method is to modify the configuration files during the "build-time" of the application, where the configuration files are modified during the construction phase of the application, prior to deployment. The build-time method requires a user or administrator having to know in advance all of the settings for each environment the application may be deployed onto, and creating a configuration file for each potential environment at the time the software application is created, or built. Both conventional methods require modification of the configuration files at a file level. With multiple environments and multiple versions of an application, there can be a voluminous number of configuration file modifications that must be maintained for an enterprise software application to function seamlessly. Corporations continually deploy new enterprise applications onto their environments and update the applications with new versions. As discussed above, each deployment requires modifying the configuration files of the application manually, making this process easily subject to human error. Thus, managing the configuration files for every application in every environment can be cumbersome and costly.

Commonly, commercial software providers supply proprietary installation programs to support their own commercial applications, which modify the configuration files of the particular application as it installs, or during "run time." For example, Microsoft supplies an installation program or "wizard" to manage deployment of Excel or Word. However, such installment programs may be used only for that specific version of the commercial software and for a particular environment, limiting the use of the installation program. A one-time deployment is not useful for a software application, such as an enterprise application, which is deployed onto multiple platforms, and which may be modified, or re-versioned, multiple times.

Thus, a need exists for an improved software configuration tool.

SUMMARY OF INVENTION

Embodiments of the present invention address this and other needs. The present invention relates to a system and method for managing the configuration files of an enterprise application. The system and method support multiple deployments of an application across multiple environments by dynamically modifying the configuration files of the application in order for the application to interface properly with each environment. More specifically, the present invention provides for management of the configuration files associated with an application by modifying the parameters within the configuration files at an application level as opposed to the conventional methods of managing the configuration files at a file level. The present invention advantageously combines two conventional methods, modification at run time, and modification at build time, by presenting a system and method to construct and/or modify the configuration files of an application during the compilation of the application, just prior to deployment onto a specific environment.

According to an embodiment of the present invention, a system for managing application configuration files includes a configuration file tool and a database containing a plurality of configuration file parameters that may be grouped into a plurality of categories, such as environment and server. Examples of these categories may include test, development, user acceptance, and quality control for environment, and application, mail, and database for server. The system includes one or more graphical user interfaces and may include one or more building tool interfaces, which allow common commercial application compiling tools and other compiling tools to interact with the system of the present invention. The system database also may contain a plurality of templates of configuration files associated with common components of enterprise applications, such as, for example, name-value pair properties files, extensible markup language (xml) files, and comma separated value (csv) files.

According to an aspect of the embodiment, the system database also may contain a plurality of pre-defined configuration files for certain components of an application, including third-party components. It is common for applications to be made up of multiple components of code, instead of being built on one single block of code. Each component may have one or more configuration files associated with it wherein the parameters within the configuration files must be modified for each environment. Accordingly, applications often have certain components in common with other applications, and typically, these components come from outside the corporation, such as, for example, from third-party programmers and/or open source coders. Thus, the system database may contain pre-defined configuration files for common application components, wherein the configuration files are defined for a specific environment.

According to another aspect of the embodiment, the configuration file tool may include a discovery component to access an application and retrieve the application's current configuration files for one or more components of the application, which typically are modified each time the application is deployed onto a new environment or a new version of the application is deployed. The system then may store the configuration files and automatically create templates for these components instead of requiring such templates to be generated manually by a system administrator.

According to another embodiment of the present invention, a method for managing configuration files of an application includes the steps of accessing a configuration file tool, and querying for one or more configuration file parameters related to a specific environment. The method further includes the configuration file tool retrieving the configuration file parameters related to the specified environment from a system database, and transmitting the parameters to a compiler. Upon receiving the configuration file parameters, the compiler generates configuration files for the application and incorporates the configuration files into the build of the application. Examples of configuration file parameters may include, but are not limited to, the servers to interface with the application, the tool bars to be made available to a user of the application, and the message format to be used by the application.

In yet another embodiment of the application, a method for managing configuration files of an application includes the steps of accessing a configuration file tool and querying for one or more pre-defined configuration files associated with certain components of an application. The method further includes the configuration file tool retrieving the configuration files from the system database as described above and transmitting the configuration files to a compiler. The compiler then may incorporate the pre-defined configuration files into the application build.

In yet another embodiment of the present invention, a method for managing configuration files of an application includes the steps of accessing a configuration file tool and requesting the configuration file tool to generate one or more configuration files for one or more components of an application with respect to a specific environment. The method further includes the configuration file tool accessing a system database, querying for one or more templates related to the component(s), and querying for parameters related to the specified environment. The configuration file tool then merges the retrieved parameters with the retrieved templates to create one or more configuration files for the specified component(s). The method further includes transmitting the configuration files to a compiler, and the compiler incorporating the configuration files into the application during the build of the application.

According to another embodiment of the present invention, a method for managing configuration files of an application in order to deploy the application onto a different environment, includes the steps of accessing a configuration file tool as described above, and querying for configuration file parameters associated with the different environment from a system database. The method further includes the configuration file tool retrieving the configuration file parameters, and transmitting them to a compiler, which then modifies the configuration files of the application to incorporate the configuration file parameters associated with the new environment. Alternately, the method may include the steps of retrieving pre-defined configuration files for a one or more components of the application, wherein the pre-defined configuration files contain parameters related to the different environment, or requesting the configuration file tool to generate new configuration files for one or more components of the application using stored templates related to the components and stored parameters related to the different environment.

Additional features of the methods described above may include maintaining the modifications made to a configuration file as individual versions, and comparing versions of the modifications made to a configuration file for maintenance of an application, and for further design and development of an application and/or of a future application. Further, the system of the embodiments of the present invention may include a tool for a quick search and retrieval of a specific parameter for a specific environment instead of requiring a user to search manually for the parameter through multiple configuration files. Thus, a user may view all the parameters related to a specific environment in one place instead of searching through multiple files.

BRIEF DESCRIPTION OF THE DRAWINGS

The present invention will be more readily understood from the detailed description of the embodiments presented below considered in conjunction with the attached drawings, of which.

DETAILED DESCRIPTION OF THE PREFERRED EMBODIMENTS

Figure 1:
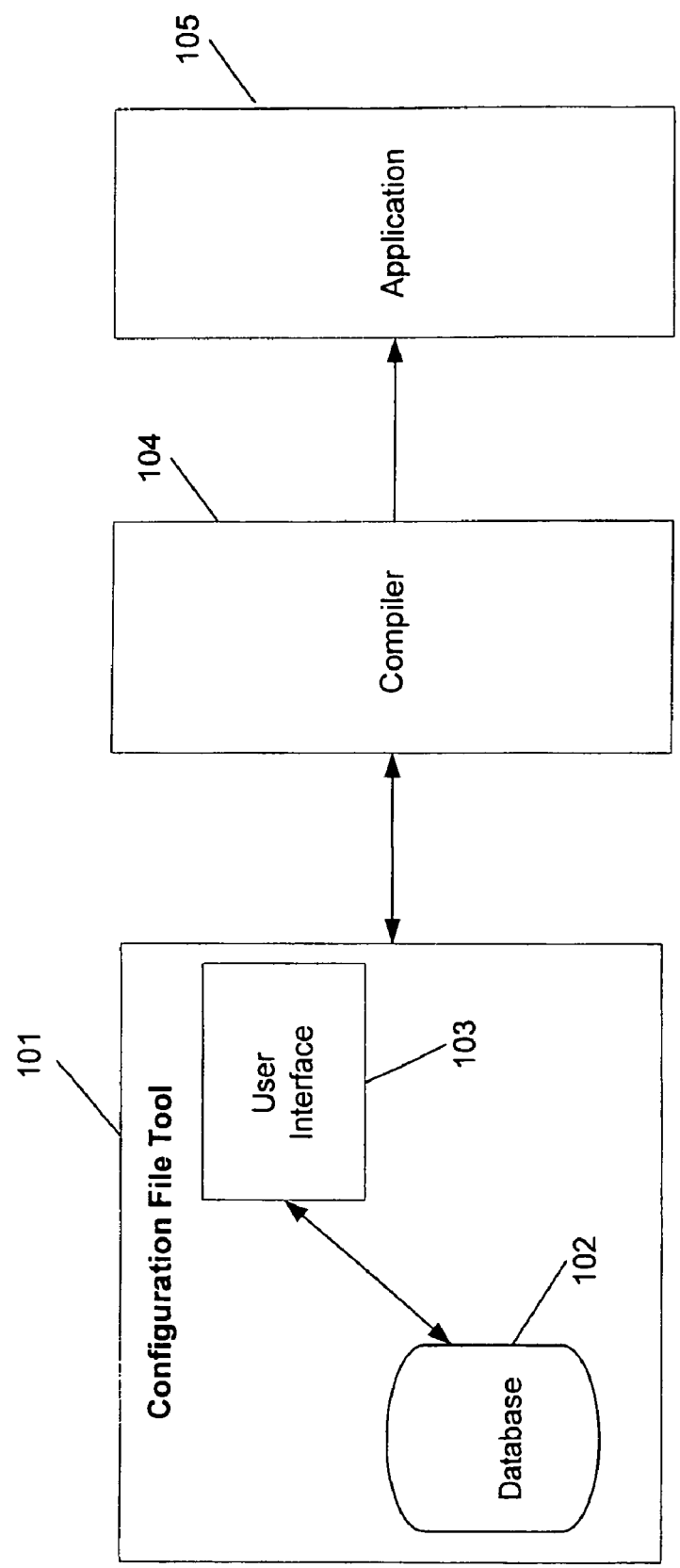
FIG. 1 presents a system for managing application configuration, according to an embodiment of the present invention.

FIG. 1 presents a system for managing configuration files of an application, according to an embodiment of the present invention. The system includes configuration file tool 101 that comprises database 102, which contains a plurality of configuration file parameters, a plurality of configuration file templates, and a plurality of pre-defined configuration files. Further, configuration file tool 101 comprises one or more user interfaces 103 that provide access to the tool by a user, such as a system administrator. The system further includes an application-building tool, such as a compiler 104, and one or more applications 105 that are generated and revised by compiler 104.

Figure 2:
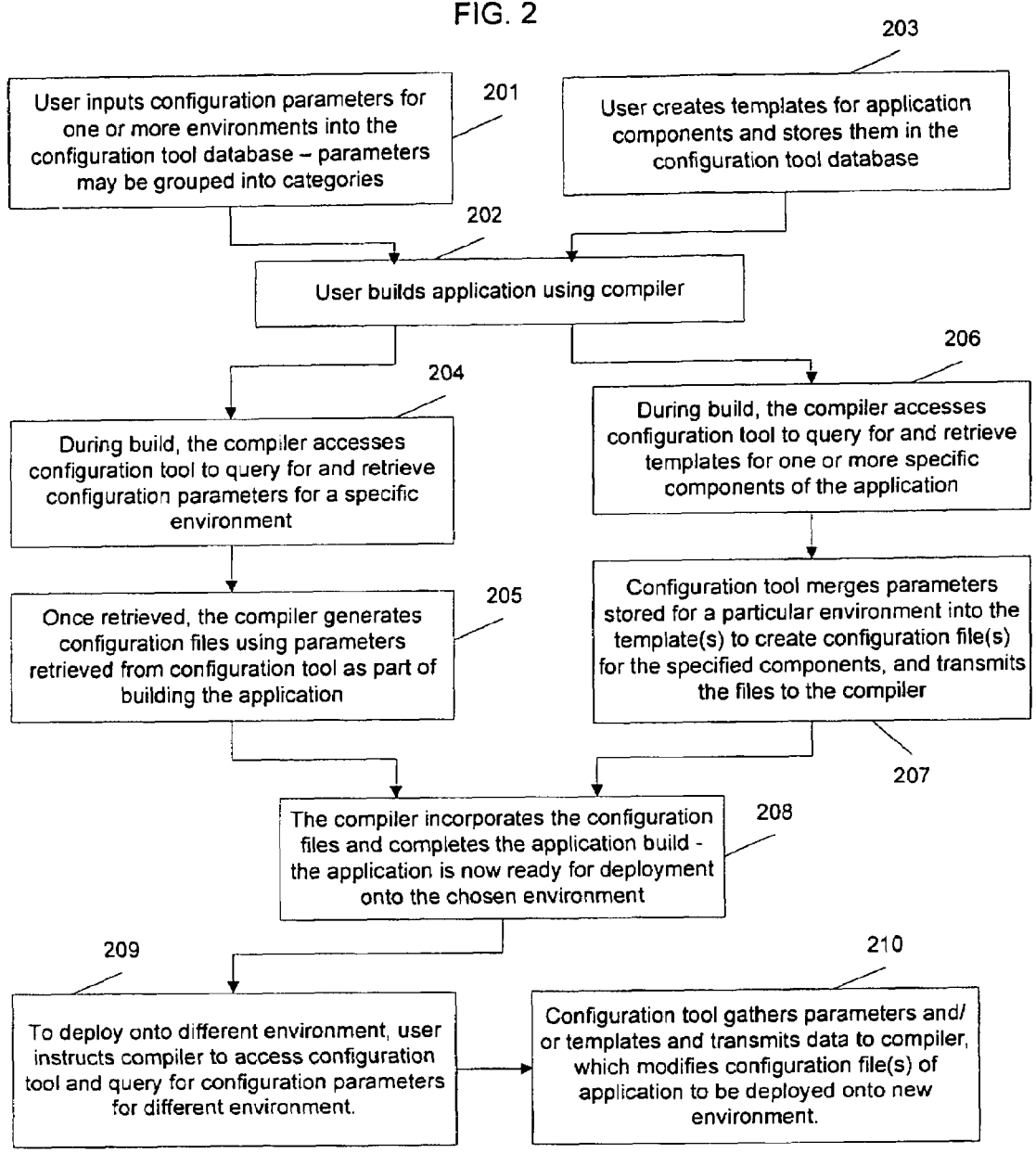
FIG. 2 illustrates a method of managing application configuration, according to an embodiment of the present invention.

FIG. 2 illustrates a method for managing configuration files, according to an embodiment of the present invention. The steps of the method need not occur in the order presented, and some of the steps may occur essentially simultaneously.

Figure 3:
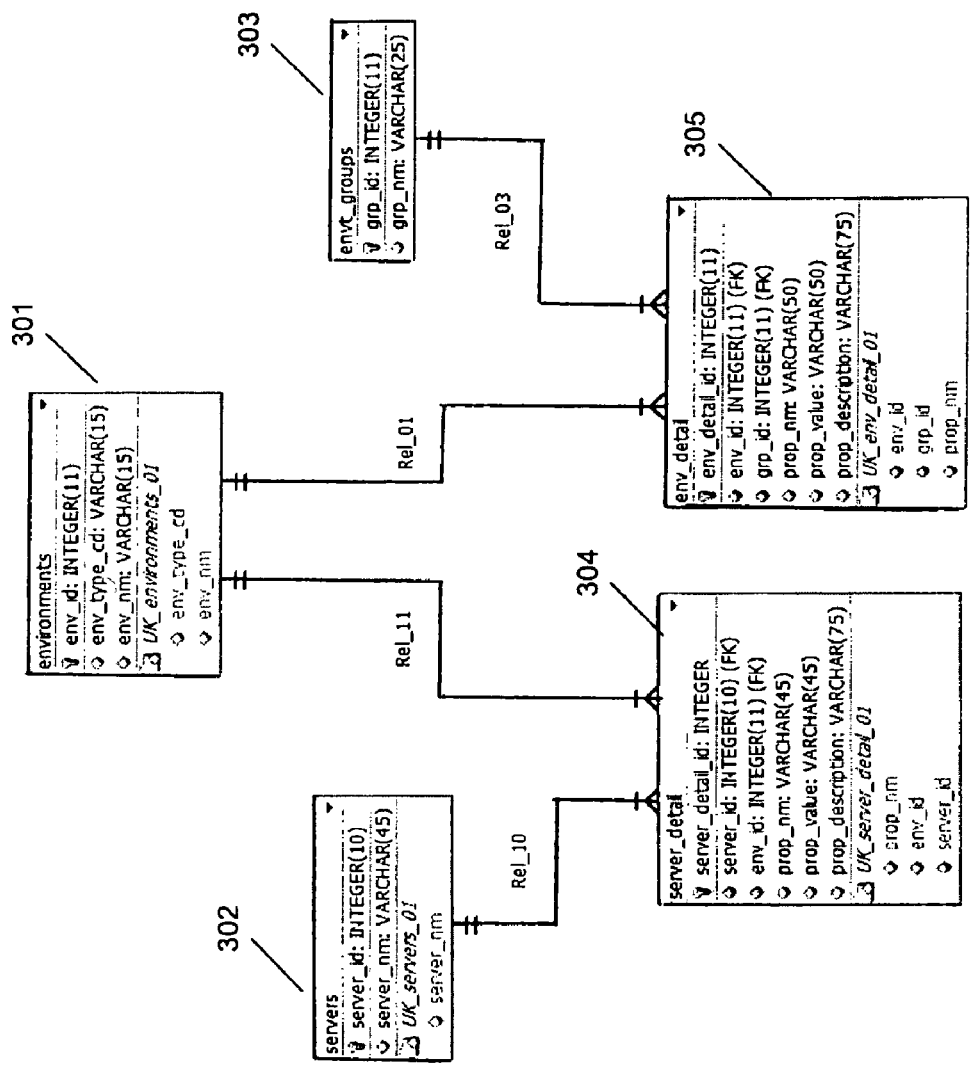
FIG. 3 illustrates examples of configuration file parameter categories, according to an embodiment of the present invention.

At step 201, a user, such as a system administrator, accesses configuration file tool 101 via a user interface 103 to input configuration file parameters associated with a one or more environments into database 102. The user may group the configuration file parameters into one or more categories, as shown in FIG. 3. The configuration file parameters may be grouped into certain categories, such as environment 301, server 302, or environment groups 303. Additionally, certain categories of configuration file parameters may be cross-linked to one another, as shown by server detail 304, which is cross-linked with server 302 and environment 301, and environment detail 305, which is cross-linked with environment 301 and environment groups 303. As shown in each of 301-305, each configuration file parameter consists of a configuration file parameter name coupled to specific value. Examples of configuration parameters are shown in Table 1 and Table 2:

TABLE 1

Development Environment

| Configuration Parameter Name | Parameter Value |
| --- | --- |
| application.log.directory | C:\dev\logfiles |
| application.log.filename | applog.txt |
| application.SMTP_server.address | 198.162.1.54 |
| application.SMTP_server.port | 4252 |
| application.log_level | DEBUG |

TABLE 2

Test Environment

| Configuration Parameter Name | Parameter Value |
| --- | --- |
| application.log.directory | /apps/test/application/logs |
| application.log.filename | applog.txt |
| application.SMTP_server.address | 235.42.36.42 |
| application.SMTP_server.port | 4252 |
| application.log_level | WARN |

In the examples above, the configuration parameters are listed as name-value pairs, for example, in the Development environment, "application.log.directory" is the name of a specific parameter and is coupled with a value "C:\dev\logfiles."

Alternately, at step 203, the user may access configuration file tool 101 to create one or more templates associated with specific components of an application. The user generates a template by selecting configuration file parameter names from one or more lists displayed by configuration file tool 101. The user then stores the template in database 102.

At step 202, the user begins to build and compile application 105 using compiler 104. During the building process, the user instructs compiler 104 to access configuration file tool 101 and query for all configuration file parameters associated with a specific environment, as shown at step 204. Upon retrieving the requested configuration file parameters from database 102, configuration file tool 101 transmits the parameters to compiler 104, which generates configuration files using the received parameters as part of the build of application 105, as shown at step 205.

Alternately, a user may instruct compiler 104 to access configuration file tool 101 and request for configuration files to be created for one or more components of application 105 for a specific environment, as shown at step 206. Upon receiving this request, configuration file tool 101 queries database 102 for one or more templates that relate to the components of application 105 specified by the user. Additionally, configuration file tool 101 queries database 102 for configuration file parameters associated with the environment specified by the user. At step 207, configuration file tool 101 then merges the retrieved configuration file parameters with the retrieved templates by matching each configuration file parameter name to the parameter names that are listed in each template. For each match, configuration file tool 101 assigns the related parameter value to the parameter name in the template. Once the matching process is complete, configuration file tool 101 saves each filled template as a configuration file related to a specific component and a specific environment. Configuration file tool 101 then transmits the configuration files to compiler 104.

At step 208, compiler 104 incorporates the configuration files, whether received from configuration file tool 101 or generated by compiler 104, into the build of application 105. Once the build is complete, the user may proceed with deploying application 105 onto the specified environment.

At some point, the user may wish to deploy application 105 onto a different environment, which requires revision of the configuration files of application 105. At step 209, the user may instruct compiler 104 to access configuration file tool 101 and query for configuration file parameters for the different environment. Alternately, the user may instruct compiler 104 to request for configuration file tool 101 to generate new configuration files for specific components within application 105 using the configuration file parameters associated with the different environment. Configuration file tool 101 repeats the steps described above and either transmits configuration file parameters directly to compiler 104 in order for compiler 104 to rewrite the configuration files of application 105, or transmits modified configuration files for certain components within application 105, as shown at step 210. Compiler 104 incorporates the rewritten or modified configuration files into application 105 and prepares application 105 for deployment onto the different environment.

While the present invention has been described with respect to what is presently considered to be the preferred embodiment(s), it is to be understood that the invention is not limited to the disclosed embodiment(s). To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A computer implemented method of managing configuration files of an application, wherein the method comprising the steps of:
    storing a plurality of configuration file parameters, wherein each of the configuration file parameters relates to a specific environment and comprises a name coupled with a value;
    querying for at least one configuration file parameter related to a specific environment;
    retrieving the at least one configuration file parameter;
    generating at least one configuration file for an application wherein the at least one configuration file incorporates the retrieved at least one configuration file parameter;
    incorporating the at least one configuration file into a compiled build of the application;
    deploying the compiled build of the application into the specific environment;
    running the compiled build the application in the specific environment; and displaying outputs from the running compiled build of the application on a user interface;
    wherein a configuration tool further comprises a discovery component, wherein the discovery component accesses the application to retrieve at least one configuration file contained within the application, and stores the at least one configuration file in a database.

2. The method according to claim 1, further comprising the step of manually inputting the plurality of configuration file parameters into a computer-readable memory.

3. The method according to claim 1, further comprising the step of accessing the application and retrieving the plurality of configuration file parameters from at least one configuration file of an application.

4. The method according to claim 1, the storing step further comprising grouping the plurality of configuration file parameters into categories, wherein the categories include one or more of an environment, a server, and an environment group.

5. A computer implemented method of managing configuration files of an application, the method comprising the steps of:
    storing a plurality of pre-defined configuration files, wherein each configuration file relates to a component of the application and relates to a specific environment;
    querying for at least one pre-defined configuration file;
    retrieving the at least one pre-defined configuration file;
    incorporating the at least one pre-defined configuration file into a compiled build of the application;

deploying the compiled build of the application into the specific environment;

running the compiled build of the application in the specific environment; and displaying outputs from the running compiled build of the application on a user interface;

wherein a configuration tool further comprises a discovery component, wherein the discovery component accesses the application to retrieve at least one configuration file contained within the application, and stores the at least one configuration file in a database.

6. A computer implemented method of managing configuration files of an application, the method comprising the steps of:

storing a plurality of templates and a plurality of configuration file parameters;

generating at least one configuration file, said generating comprising the steps of:

querying for at least one template of the plurality of templates, wherein the at least one template relates to a component of the application and includes a list of configuration file parameter names;

querying for at least one configuration file parameter, wherein the at least one configuration file parameter relates to at least one environment and comprises a name coupled with a value; and merging the at least one template with the at least one configuration file parameter to generate the at least one configuration file;

incorporating the at least one configuration file into a compiled build of the application;

deploying the compiled build of the application into the specific environment;

running the compiled build of the application in the specific environment; and displaying outputs from the running compiled build of the application on a user interface;

wherein a configuration tool further comprises a discovery component, wherein the discovery component accesses the application to retrieve at least one configuration file contained within the application, and stores the at least one configuration file in a database.

7. The method according to claim 6, the merging further comprising the steps of:

matching a name associated with a configuration file parameter with an identical name in the list of configuration file parameter names; and assigning a value coupled to the name of the configuration file parameter to the matching configuration file parameter name in the list of the template.

8. A computer implemented method of managing configuration files of an application, the method comprising the steps of:

storing a plurality of configuration file parameters, wherein each configuration file parameter relates to at least one environment;

querying for at least one configuration file parameter;

retrieving the at least one configuration file parameter; and modifying at least one configuration file of the application to incorporate the retrieved at least one configuration file parameter in order to deploy the application onto a different environment;

incorporating the at least one configuration file into a compiled build of the application for the different environment;

deploying the compiled build of the application into the specific environment;

running the compiled build of the application in the specific environment; and displaying outputs from the running compiled build of the application on a user interface;

wherein a configuration tool further comprises a discovery component, wherein the discovery component accesses the application to retrieve at least one configuration file contained within the application, and stores the at least one configuration file in a database.

9. The method according to claim 8, further comprising the step of maintaining modifications made to the at least one configuration file as a plurality of versions.

10. The method according to claim 9, further comprising the step of comparing each version in the plurality of versions for maintenance of the application.

11. A system for managing configuration files of an application comprising:

a configuration file tool;

a database comprising a plurality of configuration file parameters; and a compiler, for compiling a build version of the application using at least one configuration file configured by a user at the user interface, and using the plurality of configuration file parameters;

a processor, on which the compiled build of the application can be deployed into the specific environment, and on which the compiled build of the application in the specific environment can be run; and a user interface for displaying outputs from the running compiled build of the application;

wherein the configuration tool further comprises a discovery component, wherein the discovery component accesses the application to retrieve at least one configuration file contained within the application, and stores the at least one configuration file in the database.

12. The system according to claim 11, wherein the database further comprises a plurality of templates wherein each template relates to at least one component of the application.

13. The system according to claim 11, wherein the database further comprises a plurality of pre-defined configuration files, wherein each pre-defined configuration file relates to a component of the application and relates to a specific environment.

14. The system according to claim 11, wherein the plurality of configuration file parameters are grouped into a plurality of categories including one or more of an environment, server, and an environment group.

15. The system according to claim 11, wherein the plurality of configuration file parameters includes one or more of a server name, a tool bar, and a message format for use by the application.

16. The system according to claim 11, further comprising at least one interface to interact with an application-building tool.

17. The system according to claim 11, wherein each configuration file parameter comprises a name coupled with a value.

18. A programmable computer for use in managing configuration files of an application, said programmable computer comprising:

at least one memory including at least one region for storing computer executable program code;

a processor for executing the program code stored in said at least one memory, wherein the program code includes:

code for storing a plurality of configuration file parameters wherein each configuration file parameter relates to a specific environment and comprises a name coupled with a value;

code for querying for at least one configuration file parameter related to a specific environment;

code for retrieving the at least one configuration file parameter;

code for generating at least one configuration file for an application wherein the at least one configuration file incorporates the retrieved at least one configuration file parameter; and code for incorporating the at least one configuration file into a compiled build of the application;

code for deploying the compiled build of the application into the specific environment; and code for running the compiled build of the application in the specific environment; and a user interface for displaying outputs from the running compiled build of the application on a user interface;

wherein a configuration tool further comprises a discovery component, wherein the discovery component accesses the application to retrieve at least one configuration file contained within the application, and stores the at least one configuration file in a database.

* * * * *